(12) United States Patent
Calhoon et al.

(10) Patent No.: US 7,375,492 B2
(45) Date of Patent: *May 20, 2008

(54) INDUCTIVELY CHARGED BATTERY PACK

(75) Inventors: John Charles Calhoon, Woodinville, WA (US); Leroy B. Keely, Portola Valley, CA (US); William Mitchell, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 48 days.

This patent is subject to a terminal disclaimer.

(21) Appl. No.: 10/733,760

(22) Filed: Dec. 12, 2003

(65) Prior Publication Data

US 2005/0127867 A1 Jun. 16, 2005

(51) Int. Cl.
  *H02J 7/00* (2006.01)
(52) U.S. Cl. .................................... 320/108; 320/106
(58) Field of Classification Search ............... 320/106, 320/108, 132, DIG. 21, 136
  See application file for complete search history.

(56) References Cited

U.S. PATENT DOCUMENTS

| | | | | |
|---|---|---|---|---|
| 5,396,538 A | * | 3/1995 | Hong | 455/573 |
| 5,455,466 A | * | 10/1995 | Parks et al. | 307/104 |
| 5,596,567 A | * | 1/1997 | deMuro et al. | 320/106 |
| 5,734,254 A | * | 3/1998 | Stephens | 320/106 |
| 5,959,433 A | | 9/1999 | Rohde | 320/104 |
| 6,114,832 A | * | 9/2000 | Lappi et al. | 320/108 |
| 6,163,132 A | * | 12/2000 | Higuchi et al. | 320/132 |
| 6,184,651 B1 | * | 2/2001 | Fernandez et al. | 320/108 |
| 6,208,115 B1 | * | 3/2001 | Binder | 320/108 |
| 6,275,143 B1 | * | 8/2001 | Stobbe | 340/10.34 |
| 6,278,210 B1 | | 8/2001 | Fatula, Jr. et al. | 310/12 |
| 6,291,966 B1 | * | 9/2001 | Wendelrup et al. | 320/106 |
| 6,331,744 B1 | | 12/2001 | Chen et al. | 320/171 |
| 6,489,745 B1 | | 12/2002 | Koreis | 320/108 |
| 2002/0159434 A1 | * | 10/2002 | Gosior et al. | 370/350 |
| 2003/0155892 A1 | * | 8/2003 | Poletti | 320/137 |
| 2003/0236975 A1 | * | 12/2003 | Birk et al. | 713/156 |
| 2004/0145342 A1 | * | 7/2004 | Lyon | 320/108 |

OTHER PUBLICATIONS

Remy Chevalier, Prius in the Wild, 1998, www.electrifyingtimes/priustest.html, p. 2.*
Splashpower, Product Overview, www.splashpower.com, p. 1, Dec. 12, 2003.
Smart Battery System Specifications, Smart Battery Data Specification, Revision 1.1 54 pages, Dec. 11, 1998.
Smart Battery System Specifications, Smart Battery Charger Specification, Revision 1.1, 39 pages, Dec. 11, 1998.
System Management Bus (SMBus) Specification Version 2.0, System Management Bus (SMBus) Specification, Version 2.0, p. 1-59, Aug. 3, 2000.

* cited by examiner

*Primary Examiner*—Adolf Berhane
*Assistant Examiner*—Samuel Berhanu
(74) *Attorney, Agent, or Firm*—Birch, Stewart, Kolasch & Birch, LLP (57) ABSTRACT

An inductive charging systems transfers energy by inductively coupling a source coil on a charging source to a receiver coil on a charging portion of a battery pack. The source current is received in the battery pack and converted to direct current for storage in the battery pack cells. Communication between a charging source and the charging portion is provided. A wireless communication arrangement provides for authentication of devices that are allowed by a source to be charged.

19 Claims, 8 Drawing Sheets

INDUCTIVELY CHARGED BATTERY PACK

CROSS-REFERENCE TO RELATED APPLICATIONS

The present application is related to application Ser. No. 10/733,850, entitled "Inductive Power Adapter," and filed on Dec. 12, 2003; which is related to application Ser. No. 10/733,820, entitled "Inductive Battery Charger," and filed on Dec. 12, 2003, each of which is incorporated by reference herein as to their entireties.

FIELD OF THE INVENTION

Aspects of the present invention relate to battery packs for electronic apparatus. More particularly, aspects of the present invention relate to an inductively charged battery pack for electronic apparatus.

BACKGROUND OF THE INVENTION

Computer systems have become increasingly popular in modern society. Conventional computer systems, especially computer systems using graphical user interface (GUI) systems, accept user input from a conventional input device, such as a keyboard for entering text, and a pointing device, such as a mouse for operating the graphical user interface. The processing capabilities of computers have increased the efficiency and productivity of workers in a wide range of professions. Marketing staff, corporate executives, professionals and others use mobile computers to easily transport their data and work with computers out of the office or on travel.

The popularity of portable electronic devices allow users to work and play free of restrictive power cords and chargers for a limited period of time. As people work outside of their traditional office, they often find themselves using their notebook computers, cellular phones, digital assistants and tablet computers. Similarly, people enjoying themselves away from the home take advantage of portable music players, digital cameras, electronic game systems and the like while on travel or doing outdoors activities.

Rechargeable batteries are used for portable electronic devices, such as portable computing systems, video cameras, and mobile phones. While users attempt to operate with the freedom of mobile computing, there are still basically tethered to the power cable. The users must think about how much power is available for mobile use and the availability time period. This time period is limited to the type of battery and other factors. Users often carry power cables and AC power adapters with them so they can physically connect to electronic power for recharging when the battery power gets too low. These users must search for electrical plug-in locations that may be in inconvenient places and potentially create risk hazards for other people who might walk into the power cords. Still at other times, the user may fumble with various types of power connectors for the specific electronic device. Additionally, users often carry supplemental battery packs to replace the depleted energy of the battery. Besides the general inconvenience of carrying additional battery packs, these actions create additional problems, including wasting space in cases and increasing the weight load a user must carry. Thus, the mobile computing user still does not receive the freedom of portable computing.

Thus, what is needed is an apparatus and method to support user interaction for an untethered environment for the new media technologies and productivity activities for mobile electronic devices.

SUMMARY OF THE INVENTION

Aspects of the present invention provide inductive charging arrangement enabling user convenience in wireless power environments for mobile electronic devices and communications devices. An inductive charging system transfers energy by inductively coupling a source coil on a charging source to a receiver coil on a battery charging portion. Aspects of the present invention enable communication between a charging source and the battery charging portion which maximizes the flexibility, efficiency or safety of the inductive charging solutions. Aspects of the present invention provide for wirelessly communicating data between a charging source and the battery charging portion. A wireless communication arrangement may also provide for authentication or digital signature of devices that are allowed by the charging source to be charged.

The above and other aspects, features and advantages of the present invention will be readily apparent and fully understood from the following detailed description illustrative embodiments in conjunction with the accompanying drawings, which are included by way of example, and not by way of limitation with regard to the claimed invention.

DETAILED DESCRIPTION OF THE INVENTION

The following description is divided into sub-sections to assist the reader. The subsections include Overview; Illustrative Host Operating Environment; Charging System Environment; Illustrative Data Structure; Illustrative Operating Environment; and Alternative Charging Systems.

Overview

Aspects of the present invention provide inductive charging solutions enabling user convenience in wireless power environments for mobile computing and communications devices. An inductive charging system transfers energy by inductively coupling a source coil on a charging source to a receiver coil on a charging portion of a battery pack. Current flows through the source coil and the resulting magnetic flux induces an alternating current through the magnetic field and across the receiver coil, completing an energy transfer circuit. The source AC current is received in the battery pack and converted to direct current for storage in an energy storage unit of the battery pack. Aspects of the present invention enable communication between a charging source and the battery charging portion which maximizes the flexibility, efficiency and safety of the inductive charging solutions. Aspects of the present invention may or may not provide for wirelessly communicating operating parameters, such as charging voltage and maximum expected power consumption, between a charging source and the battery charging portion. A wireless communication arrangement may also provide for authentication of devices that are allowed by the source to be charged.

An illustrative aspect of the present invention includes an apparatus which transmits inductive energy to a battery pack. The battery pack may include a microprocessor for processing data relevant to the inductive energy. A memory may be provided for storing computer readable instructions relevant to charging a battery pack. A processor unit may be operatively coupled to the memory. A transmission element may be operatively coupled to the processor so as to provide the inductive energy to the battery pack.

In another illustrative aspect of the present invention, a battery pack may be configured for receiving inductive energy for charging. A processor unit may be provided for processing computer readable data relevant to the inductive energy and for processing data communications with a computer system. A pick up coil may be configured for receiving the inductive energy. A charger may be operatively coupled to the processor unit and the pick up coil for performing charging functions. The charger may be configured to output a direct current to an energy storage unit, such as a battery cell.

In yet another illustrative aspect of the present invention, a portable computer system may be configured to operate with a battery pack. The computer system may include a processor, a display coupled to the processor, and a memory coupled to the processor. The memory may be configured to store computer executable instruction that cause that the computing system to perform the steps of receiving an event relevant to an inductively charging battery pack and adjusting a portion of a display to indicate the event. The adjusting feature may include displaying a graphical object on the display.

In an illustrative an aspect of the present invention, a computer implemented method m may be provide for inductively charging battery pack. A polling message may be received from an inductive charging source. A request for power is transmitted to the inductive charging source. An inductive power may be received from the inductive charging source. In another aspect, authenticating data may be transmitted to the inductive charging source. Thus, a battery pack can receive electrical power through a trusted arrangement.

Illustrative Host Operating Environment

Various aspects of the present invention may at least be described in the general context of apparatus and computer-executable instructions, such as program modules, executed by one or more computers or other devices. Accordingly, it may be helpful to briefly discuss the components and operation of a general purpose computing environment on which various aspects of the present invention may be implemented. A host device system 100 can be used for processing data and communicating with a battery pack 304 (See FIG. 3). Such an illustrative host system environment is shown in FIG. 1.

Figure 1:
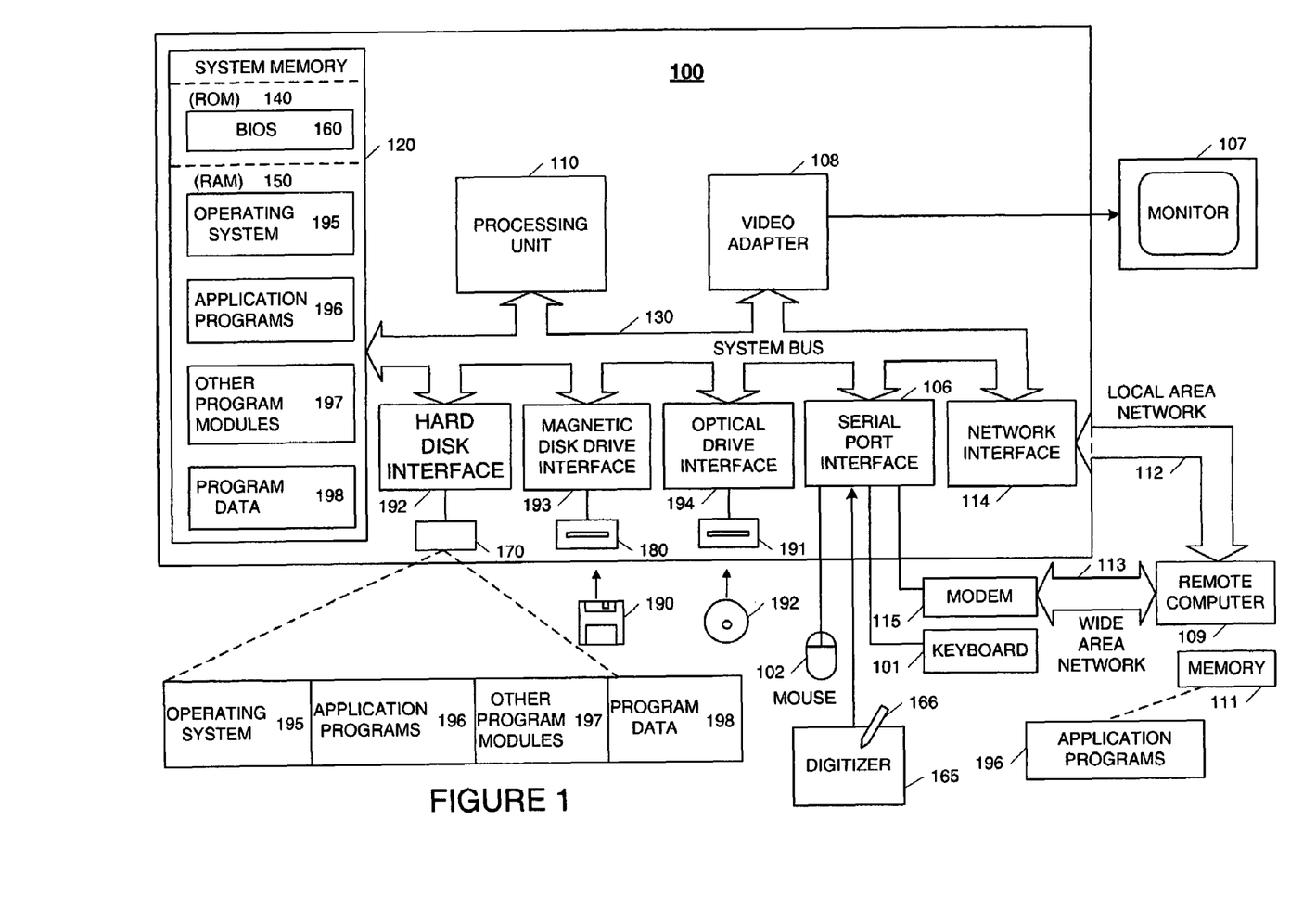
FIG. 1 is a functional block diagram of an illustrative general-purpose digital computing environment in which one or more aspects of the present invention may be implemented.

Accordingly, FIG. 1 illustrates a schematic diagram of an illustrative general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, compact flash cards, smart media, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108.

In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
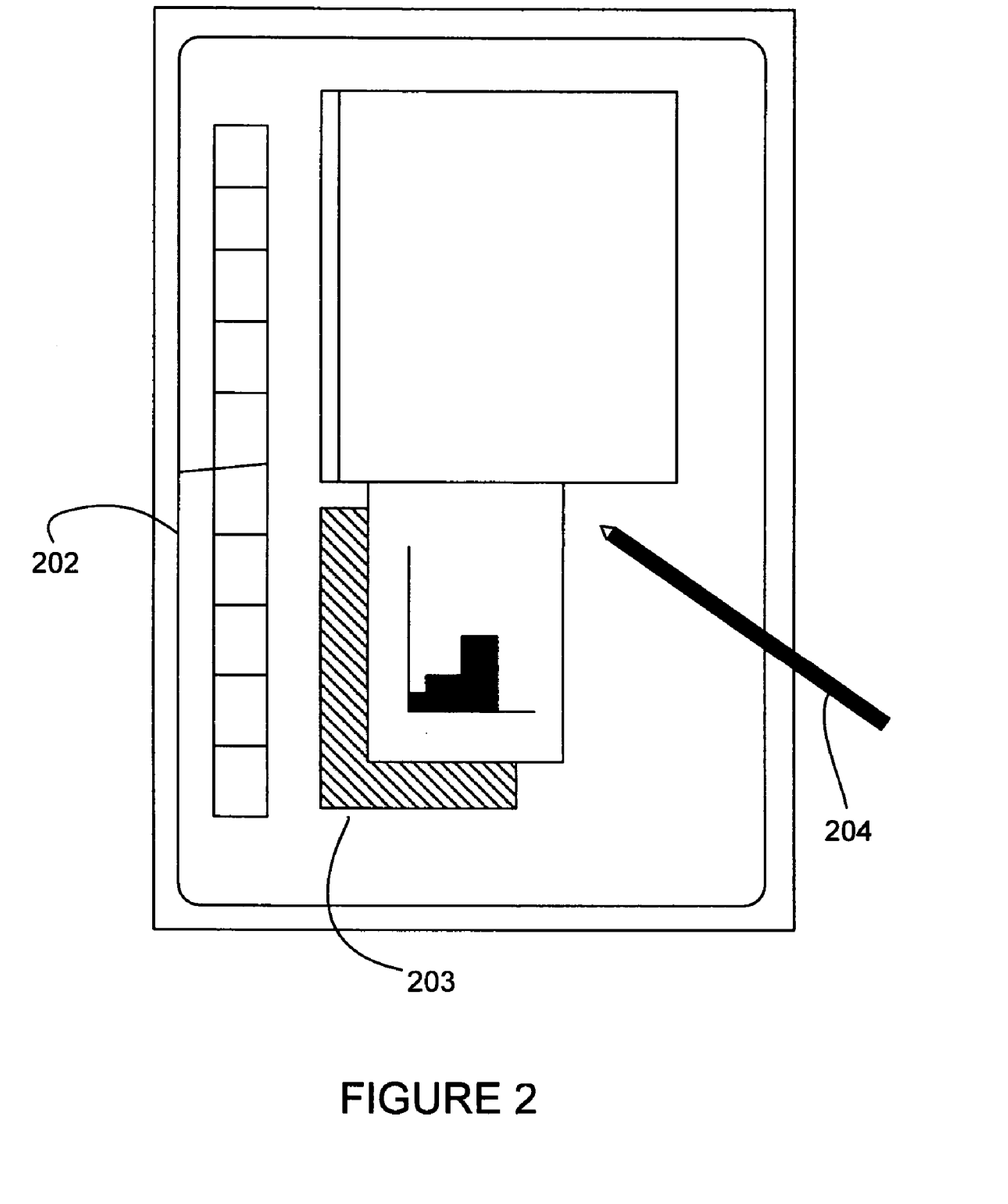
FIG. 2 is a schematic representation of a pen-computing system according to one or more aspects of the present invention.

FIG. 2 illustrates a mobile pen-based computing system 201 that may be used in accordance with various aspects of the present invention. Any or all of the features, subsystems, and functions in the system of FIG. 1 may be included in the computing system of FIG. 2. Pen-based computing system 201 includes a display surface 202, e.g., a digitizing flat panel display, such as a liquid crystal display (LCD) screen, on which a plurality of windows 203 is displayed.

Charging System Environment

Figure 3:
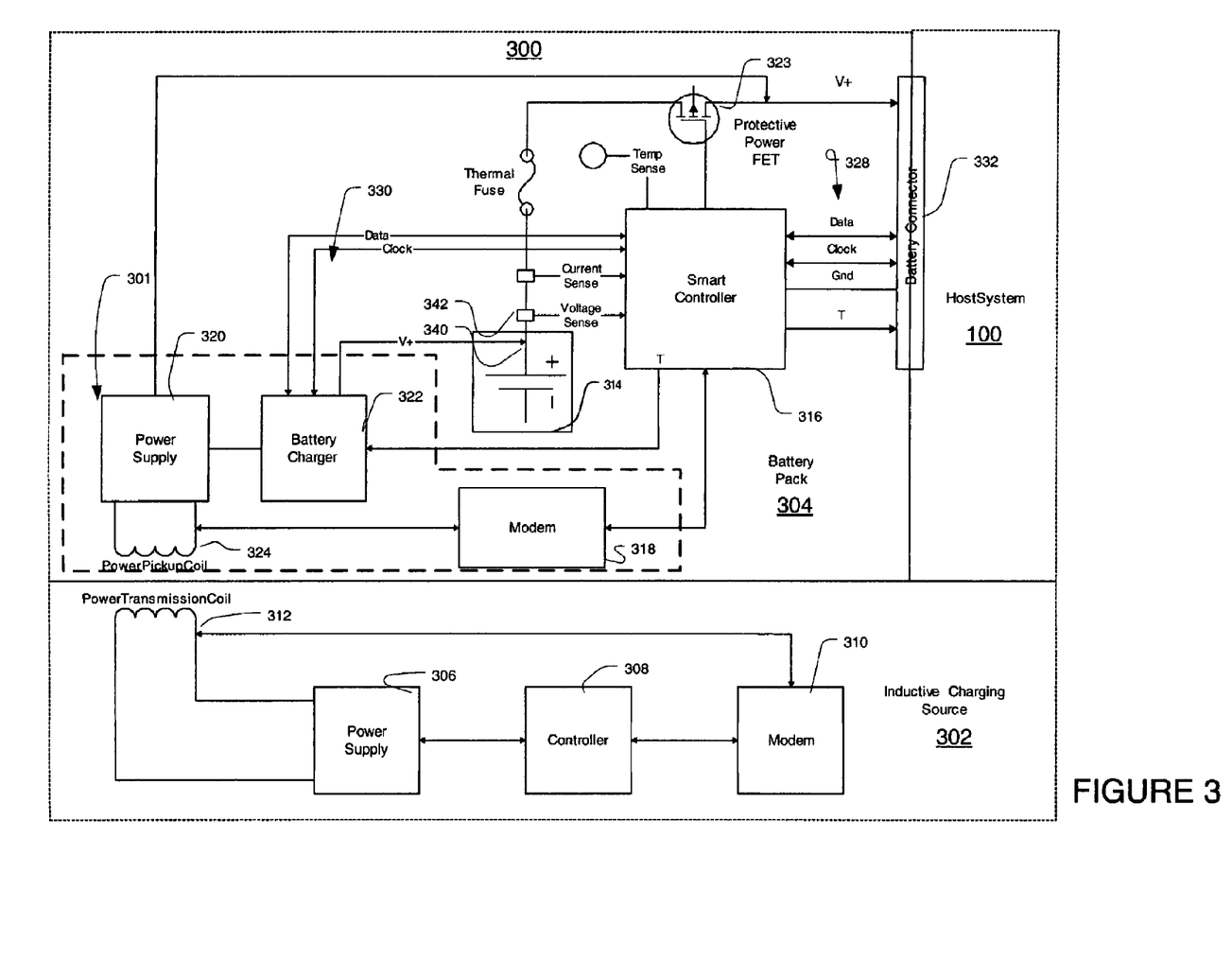
FIG. 3 is a functional block diagram of an illustrative charging system according to one or more aspects of the present invention.

Charging system arrangements in accordance with one or more aspects of the present invention are shown in FIGS. 3-8. Referring to FIG. 3, a charging system 300 may include an inductive charging source 302 that wirelessly provides electrical power to a battery pack 304 configured with an inductive charging portion or module 301. The battery pack 304 may be physically connected to the host device 100 while being charged by the inductive charging source 302. The host device 100 need not be aware of the inductive charging source or the inductive charging module of the battery pack 304. This enables the host device 100 to be any portable electronic device that is adapted to operate to electric battery power, such as mobile computers, personnel digital assistants, cellular phones and the like. Alternatively, the battery pack 304 may be charged by the inductive charging source 302 in a stand-alone arrangement. The stand-alone arrangement enables charging operations of additional battery packs without having to physically connect them into a host device or a special purpose charging dock.

Referring to FIG. 3, inductive charging source 302 is electrically connected to an alternating current power source, such as utility electrical power and the like. In such an arrangement, inductive charging source 302 may include a power supply 306 that receives electric energy via the conventional method of a cord physically coupled to a standard wall electrical outlet (not shown) for 60 Hz, 120 volt power, or alternatively, 50 Hz at 230 volts and other frequency/voltage combinations. Nevertheless, a direct current system is possible. Inductive charging source 302 may include one or more power transmission coils 312 operatively coupled to the power supply 306. The operative coupling may include any form of network connection including physical wiring and/or logical connections, and the like.

The battery pack 304 may be configured to receive electrical energy from inductive power source 302. In one arrangement shown in FIG. 3, the inductive charging module 301 of battery pack 304 may include a power pickup coil 324 that is operatively connected to a power supply 320. Power pickup coil 324 receives inductive energy from the power transmission coil 312 of inductive source 302. The power supply 320 of battery pack 304 provides electrical energy to a battery charger 322 that charges an energy storage unit 314, such as one or more battery cells, in the battery pack 304. The battery pack 304 may also contain a safety device, such as a power protective power transistor 323 or transistor arrangement, FET and the like which can shut down the battery pack 304 power to the host device 100 in an over or under current condition.

In one arrangement, power supply 306 of inductive charging source 302 may be configured to convert the frequency of the alternating line current from 50/60 Hz to a higher frequency for inductively transferring energy from the power transmission coil 312 to the power pickup coil 324 of battery pack 304. The power supply 320 of battery pack 304 may be configured receive the transmission frequency. The specific frequencies of transmission can be varied, i.e. for instance within the range of 500 Hz to 10 KHz. Nevertheless, other frequencies can be used.

In one operation, battery pack 304 configured with an inductive charging module 301 may be brought proximate or juxtaposed to the inductive charging source 302. The power transmission coil 312 of the charging source 302 and the power pickup coil 324 of the battery pack 304 are then inductively coupled by a charging alternating current at any appropriate frequency to transfer the electrical power. In an arrangement of multiple battery packs, each power transmission coil 312 may be controlled independently of each other. This feature provides a more flexible and adaptable solution for persons or organizations with different electronic devices. The multiple battery packs may have different power requirements that can be handled by the source 302. For example, cellular phone power requirements are generally less than the power needs of a laptop computer. This may be related to different voltages, currents, and power profiles.

Figure 5:
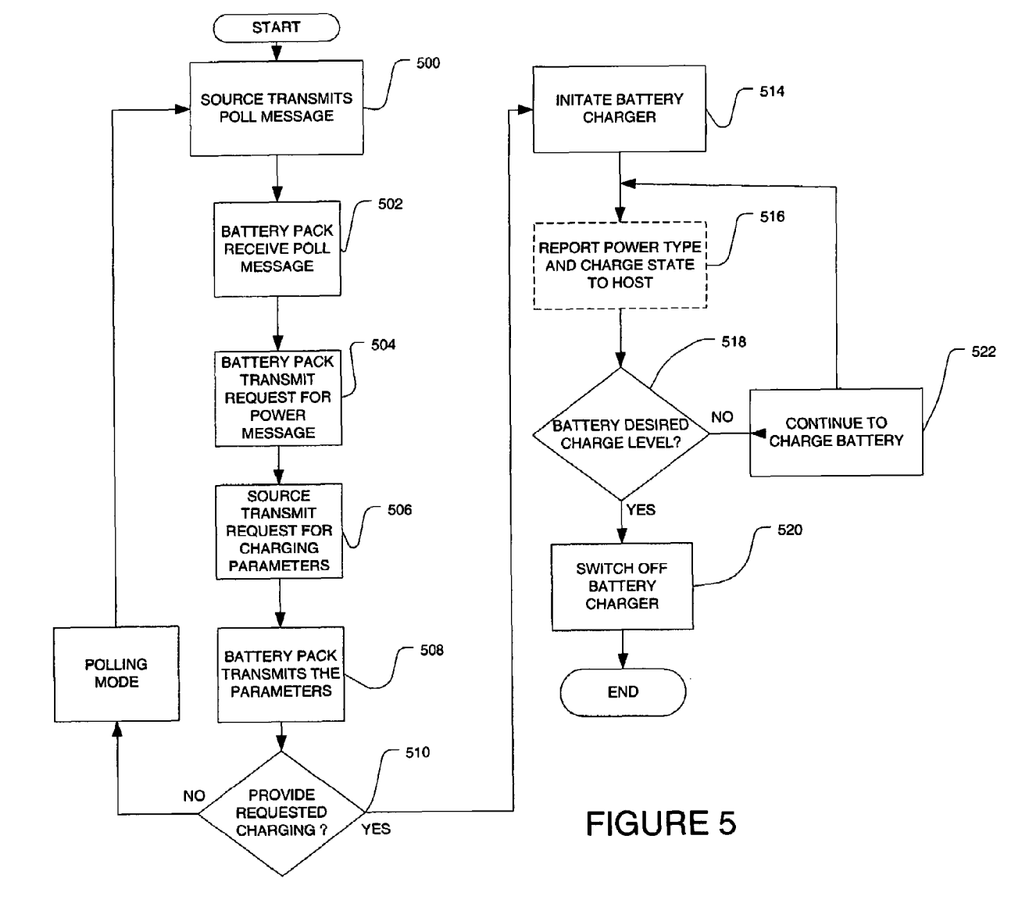
FIG. 5 is a flow diagram of a first illustrative charging process according to one or more aspects of the present invention.
Figure 6:
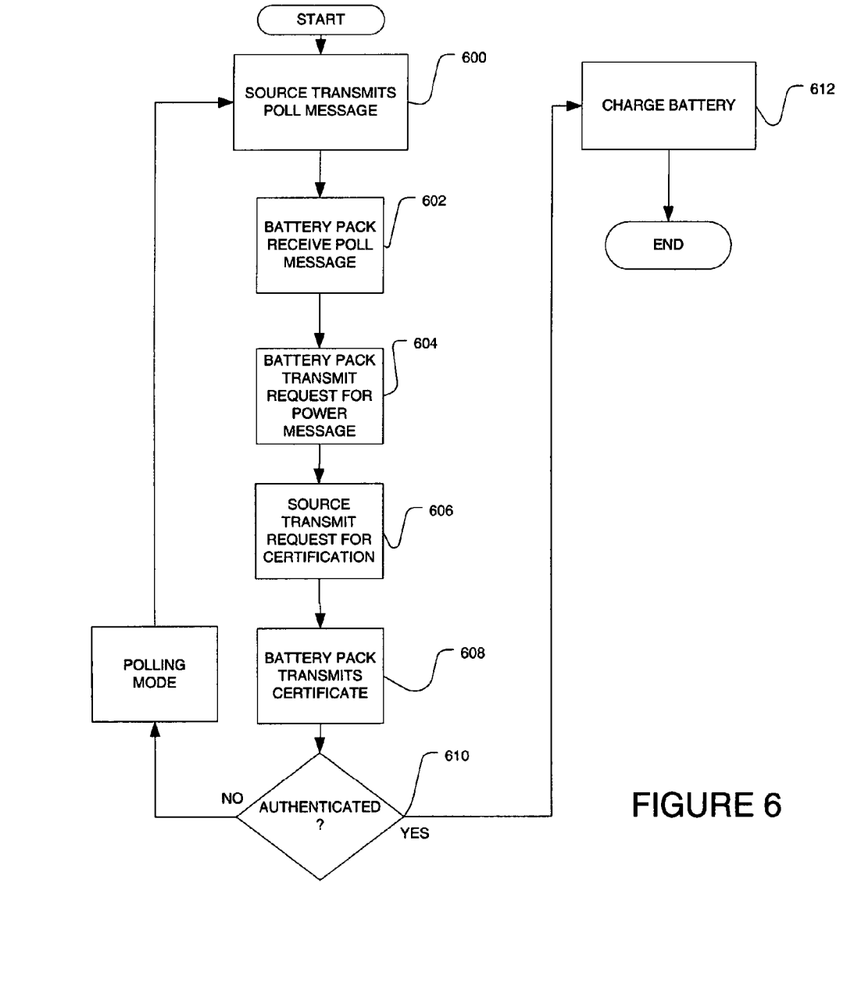
FIG. 6 is a flow diagram of a second illustrative charging process according to one or more aspects of the present invention.

The inductive charging source 302 may include a microprocessor controller 308. Likewise, the battery pack 304 may also include a smart controller 316. The controller 308 may be configured for controlling the power supply 306 for different modes of operation, processing and storing data. Likewise, smart controller 316 may be configured for receiving, transmitting and storing data and performing mathematic calculations for charging battery cell 314. Additionally, controller 308 and smart controller 316 are enabled to have features of authentication and security. Illustrative examples of authentication and security aspects of the present invention are shown in FIGS. 5 and 6. Controller 308 and smart controller 316 may have computer-readable media 415 (see FIG. 4), which provides nonvolatile storage of computer readable instructions, data structures, program modules, and other data relevant for charging operations. Other examples of computer-readable media include flash memory, random access memories (RAMs), read only memories (ROMs), and the like.

The smart controller 316 may also include an integrated analog to digital converter (not shown) for monitoring battery environmental parameters, such as temperature, voltage and current. In such as arrangement, the appropriate analog sensing devices may used, such as a voltage sensor 340 and current sensor 342. The smart controller 316 may include a communications bus 328 for interaction with the host device 100, and the inductive charging source 302. The smart controller 316 may control the battery charger 322 through a communications pathway or bus 330. The communication pathway 330 includes a data line and clock for bi-directional communications traffic between the smart controller 316 and the battery charger 322. Alternatively, communications with the battery charger 322 and smart controller 316 can implemented via a Thermistor or "T" line connection. The "T" line may also be used as a safety shutoff in the event of an over-charge or over temperature condition in the battery 314.

In one arrangement, smart controller 316 be may be implemented with one or more features of a system management bus configuration. The system management bus configuration or features thereof have not been used before in inductive power solutions or inductive battery packs. The communication bus 328 may be configured as a System Management Bus (SMbus), which informs a data processing system, such as host device 100, as to a wide range of information about the battery 314 (e.g., charge in the battery, remaining battery life, battery voltage, etc.). The SMBus is a two-wire interface system through which a processor within a battery can bi-directional communicate with the rest of a computer system, such as host device 100. One wire handles the data transfer and the second wire is the clock. SMBus enables a control bus for power management associated tasks. An example of a SMBus and functions thereof appear in the system management bus specification revision 2.0 standard available from the SBS Implementer Forum. Smart controller 316 may contain computer readable data programmed by the manufacturer, such as a battery ID number, battery type, serial number, manufacturer's name and date of manufacture. This data can be used by the inductive charging source 302 for novel charging operations according to aspects of the present invention. If desired, controller 308 may be implemented with one or more features of smart battery technology.

In one arrangement, inductive charging source 302 and battery pack 304 may be configured for wireless data communications. The inductive charging source 302 may include a communication device 310, such as a modem or network interface device. Likewise, the inductive charging module 301 of battery pack 304 may also include communications device, such as a modem 318 or network interface device. For ease of explanation, the communication device is referred herein to as a modem. The modem 310, 318 may be configured for power line carrier communications. In such a configuration, modem 310, 318 are operatively coupled to the respective coils 312, 324. Modem 310, 318 may be adapted to modulate and demodulate signals appropriate to the frequency supplied by the power supply 306, 320 to receive and transmit data. Thus, the power transmission coil 312 of the charging source 302 and the power pickup coil 324 of battery pack 304 are used to provide inductive data communications over an inductive pathway.

In one arrangement, the modems 310, 318 may be implemented with power line networking technology in accordance with the HOMEPLUG1.0 Standard Specification which is available from the Homeplug Powerline Alliance located at San Ramon, Calif., USA. For example, under a homeplug implementation, the modems may use a burst mode form of orthogonal frequency-division (OFDM) multiplexing with a forward error-correction scheme. OFDM is a well known technique in industry. The media access (MAC) protocol in a homeplug configuration is based on the well-known carrier sense multiple access with collision avoidance (CSMA/CA) protocol. Rates of data transfer can be upwards of 14 Mbps, if desired. Nevertheless, a wide range of other well-known power line networking technologies could be used, such as X-10 protocol and frequency-shift keying schemes used for internetworking within homes via the power lines. Advantageously, battery pack 304 and inductive charging source 302 can be electrically coupled for wireless energy transfer functionality and data communications to wirelessly communicate operating parameters, such as charging voltage and maximum expected power consumption. Thusly, the inductive charging module 301 and communications functionality of battery pack 304 provides a backward compatibility path for devices so that new battery packs can be retrofitted into the installed base of conventional host devices.

In an alternative arrangement shown in FIG. 3, the power supply 320 can provide current as an output to the battery charger 322, and the power supply 320 can be an SMbus device enabled to communicate on the SMbus with other devices. Likewise, battery charger 322, controller 316, or modem 318 can be SMbus devices. In this alternative arrangement, power supply 320 may be in logical communications with battery charger 322, controller 316, or modem 318. The power supply 320, battery charger 322, controller 316, or modem 318 may be configured to communicate with protocols such as shown in the noted System Management Bus Specification. Alternatively, the inductive power source 302 may include components therein configured as SMBus devices. For example, power supply 306, controller 308, or modem 310 may be SMbus operable devices. It will be appreciated that the connections shown in FIG. 3 are exemplary and other applicable techniques for establishing a communications link between the components may used. For example, in the battery pack 304, the connections between the controller 316 and power supply 320; between the smart controller 316 and the battery charger 322 are exemplary.

Illustrative Data Structure

Figure 4:
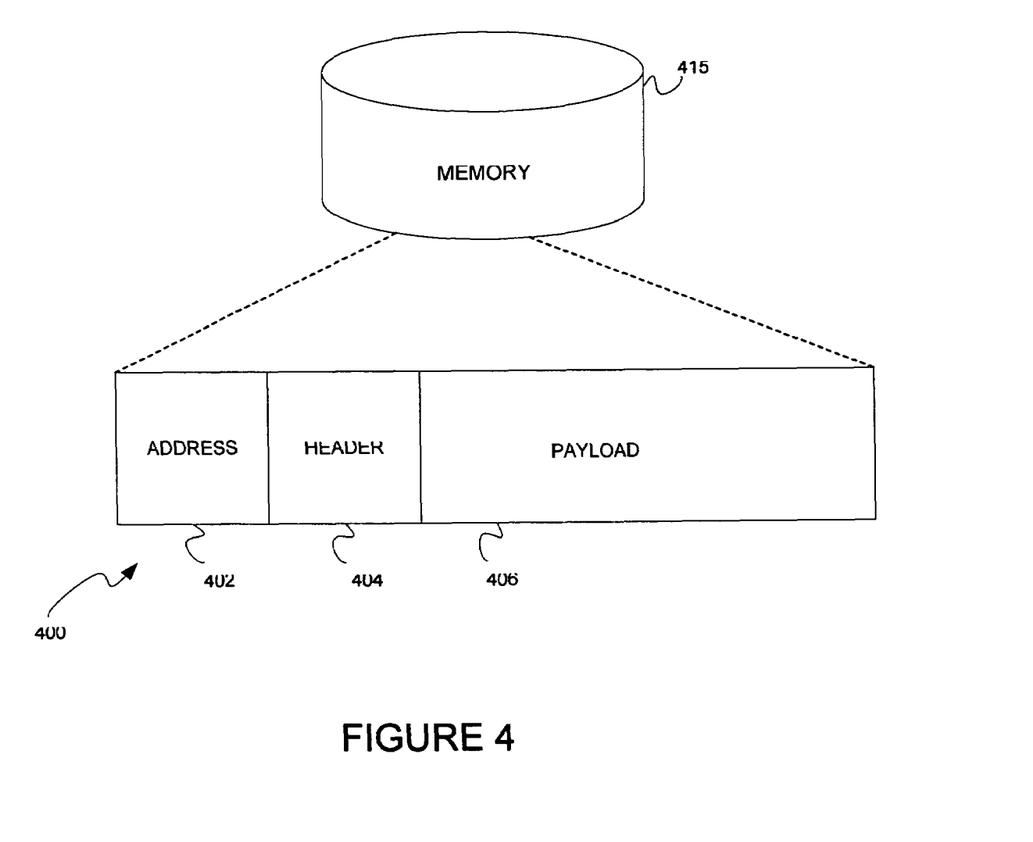
FIG. 4 is a block diagram of an illustrative data structure according to one or more aspects of the present invention.

FIG. 4 illustrates an example schematic diagram of a data structure 400 which can be transmitted between the modems 310, 318 or, alternatively, between a plurality of modems in a multiple battery pack charging environment. Data structure 400 may include an address 402, a header 404, and a payload 406. Address 402 includes data for the specific battery pack being charged. This is useful in the multiple battery pack environment because different battery packs can have different charging requirements. The header 404 includes general data to be used by the controllers 308, smart controller 316, are modems 310, 318. The payload 406 contents specific data to be used by the smart controllers relevant to the charging operation. Such data would include operating parameters, such as charging voltage and maximum expected power consumption. Nevertheless, the payload 406 may include other data, such as authentication information. Data structure 400 may be implemented with well-known powerline networking technology and/or encapsulated in another structure of packets for transmission, such as Bluetooth protocol, homeplug, or X-10 or the like.

Illustrative Operational Environment

FIG. 5 illustrates an example communication process according to one or more aspects of the present invention that enables communication between a charging source and the battery charging portion. Various aspects of the present invention may at least be described in the general context of apparatus and computer-executable instructions, such as program modules, executed by one or more computers or other devices, such as microprocessors. For example, controller 308 and smart controller 316 may have computer-readable media 415 (See FIG. 4), which provides nonvolatile storage of computer readable instructions, data structures, program modules, and other data relevant for charging operations. In one arrangement, inductive charging source 302 and battery pack 304 may be configured for wireless data communications as well as energy transfer. Accordingly, inductive power source 302 may be configured to poll for other devices, such as the battery pack 304 with inductive charging module 301.

In FIG. 5, steps 500-510 illustrate a negotiation process in which communications and power requirements can be established between inductive charging source 302 and battery pack 304. To start the process, in step 500, the inductive charging source 302, in a low power or broadcast mode, polls for compatible devices through one or more of the power transmission coils 312 and listens for replies from the devices, such as battery pack 304. The inductive charging source 302 may perform the polling operation in a sequential fashion, making each power transmission coil an independent node in the system 300. This independent node arrangement enables multiple battery packs to be charged by inductive charging source 302. The multiple battery packs may have different power requirements that can be handled by the source 302. For example, cellular phone power needs are less than that of a laptop computer. In a polling operation, power transmission coil 312 can be energized and de-energized in a regular periodic fashion. This periodic arrangement can conserve energy. It should be recognized that the controller 308 generates communication signals in the source 302 and the signals may be converted for power line modulation by the modem 308. The communication signals are routed from the modem 308 to the power transmission coil 312 for transmission to a power pickup coil 324.

In step 502, the battery pack 304 has at least a listening mode and a charging mode. In the listening mode, the battery pack 304, via smart controller 316, is configured to listen for a charging source through the power pickup coil 324. In generally, the battery pack 304 configured with an inductive charging module 301 may be brought within a proximate distance to the inductive charging source 302. Once the transmission coil 312 and pickup coil 324 are in close enough proximity to establish communications and inductive coupling, the communication signals received by the pickup coil 324 are de-modulated by the modem 308 and routed to the battery pack 304 smart controller 316. Of course, the communication signals may be the type as referenced with data structure 400 (See FIG. 4). The smart controller 316 may be configured to monitor the energy capacity of the battery cell 314.

In step 504, if battery cell 314 is in need for recharging, the battery pack 304, via smart controller 316, may respond to the source 302 poll with a message requesting that power be supplied thereof. In step 506, upon receiving the battery pack's request for power, the source 302 may request information or charging parameters from the battery pack 304, such as the required charging voltage and maximum power requirement. Nevertheless, the inductive charging source 302 can request other information relevant to the battery pack 304, such as a battery ID number, battery type chemistry, and serial number. This information can be used for security, data integrity, or other purposes. In step 508, the battery pack 304 transmits the requested information. In step 510, the source 302, via controller 308, determines if it can supply the requested voltage and power to battery pack 304. In step 512, if the source 302 cannot supply the requested voltage and/or power, then the source 302 can change to the polling mode. Alternatively, if the source 302 can provide the voltage and/or power, then the process flows to step 514 for the charging mode.

After the negotiation process, in step 514, when the battery pack 304 begins to receive its requested voltage and power, the smart controller 316 may turn on the battery charger 322 in order to charge the one or more battery cells 314. Optionally, in step 516, when the battery pack 304 is receiving power from inductive charging source 302, the smart controller 312 may report to the host device 100, via the communications bus 328, that it is receiving external power and the charging state. In one case, the smart controller 316 can report that the external power is from an inductive power source, rather than a standard utility power. In such arrangement, a visual indication of the inductive charging arrangement may be provided in the form of a graphical icon configured to operate with an appropriate event-driven operating system. Thus, a graphical user interface can have a display portion relevant to the type of power being received, e.g., inductive power. In the context of the present invention, a displayed "object" may include text, graphics, and other related elements for a display, such as monitor 107 or display surface 202 (See FIGS. 1 and 2, respectively). In step 518, the smart controller 316 samples the capacity level of the battery 314 during the charging process. In step 520, if the battery is charged to the desired level, the battery charger 322 can be switched off-line. When power from the source is lost, the battery pack returns to its listening mode. In step 522, if the battery 314 is not at the desired level of charge, then the charging process is continued. Nevertheless, during the charging mode, the power supply 320 of battery pack 304 can provide electrical power to the host device 100 when so connected.

FIG. 6 illustrates an example communication process according to one or more aspects of the present invention to enable communication between a charging source and the battery charging portion. In one arrangement, inductive charging source 302 and battery pack 304 may be configured for wireless data communications as well as energy transfer based on authentication information thereby forming a trusted energy transfer arrangement. This trusted energy transfer arrangement is useful to prevent authorized use of an inductive charging source. Also the trusted energy transfer arrangement prevents a computer virus from infecting the smart controller 316 or the host device 100 via the information stores and data transmission pathways between the host device 100 and controller 316. Additionally, this trusted arrangement can prevent unwanted power from being transmitted to metallic objects, such as writing instruments, beverage cans and staplers, which may be placed in close proximity to a charging source.

To start the process, in step 600, the inductive charging source 302, in a low power or broadcast mode, polls for compatible devices through one or more of the power transmission coils 312 and listens for replies from the devices, such as battery pack 304. In step 602, in the listening mode, the battery pack 304, via smart controller 316, is configured to listen for a charging source through the power pickup coil 324. Once the transmission coil 312 and pickup coil 324 are in close enough proximity to establish communications and inductive coupling, the communication signals received by the pickup coil 324 are de-modulated by the modem 308 and routed to the battery pack 304 smart controller 316. In step 604, if battery cell 314 is in need for recharging, the battery pack 304 may respond to the source 302 poll with a message requesting that power be supplied thereof. In step 606, upon receiving the battery pack's request for power, the inductive charging source 302 may request for a security certificate or digital signature from the battery pack 304 to authenticate it. The security certification or digital signature may be stored in the computer readable storage of the smart controller 308. In step 608, if battery pack 304 has a certificate or signature, the battery pack 304 transmits to the source 302. In step 610, if the battery pack 304 is authenticated, the source 302 supplies the requested voltage and power to charge the battery cells as shown in step 612. During the charging process, the source 302 may periodically poll the battery pack 304, and if no response is received or inductive coupling is removed, the source 302 changes state from the charging mode to return to the polling mode. In step 610, if the battery pack 304 is not authenticated, or the source 302 cannot supply the requested voltage or power, the source 302 will remain in low power mode, and the source 302 will return to polling mode. Nevertheless, steps any or all of steps 500-522 in FIG. 5 can be implemented in the process shown in FIG. 6.

Alternative Charging Systems

Figure 7:
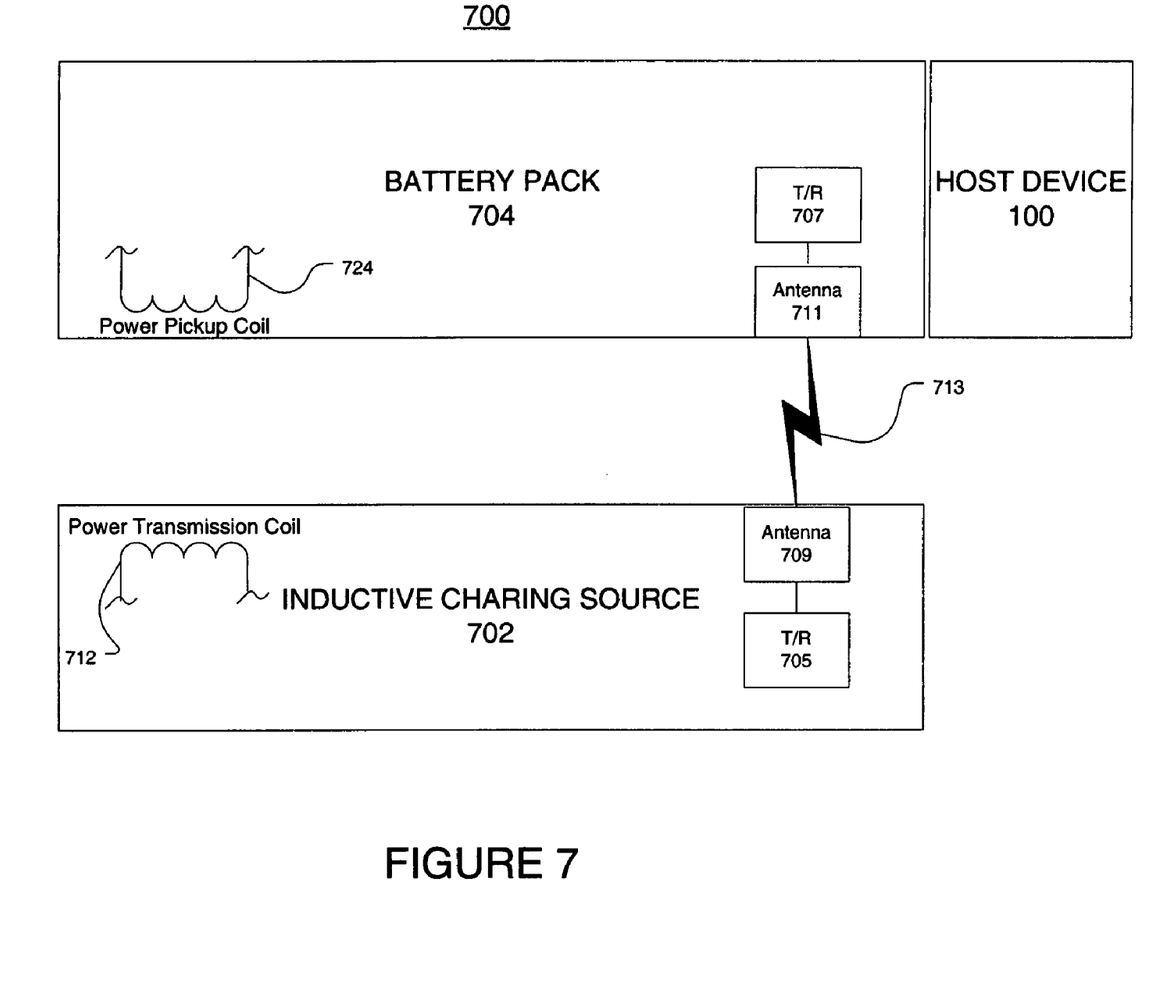
FIG. 7 is a functional block diagram of an alternative charging system according to one or more aspects of the present invention.

An alternative the charging system 700 is illustrated in FIG. 7. Charging system 700 components may include an inductive charging source 702 that wirelessly provides electrical power to a battery pack 704 configured with an inductive charging portion or module 701. In the charging system 700 communications between the inductive charging source 702 and battery pack 704 may be accomplished via an antenna and transceiver arrangement. A transceiver 705, 707 may be operatively coupled to an antenna 709, 711 for receiving and transmitting a wireless communication payload for both the inductive charging source 702 and the battery pack 704. Any or all features and functions, subsystems shown in FIG. 3 can be implemented in the charging system 700 shown in FIG. 7. For example, transceiver 705, 707 are respectively operatively coupled to a controller of inductive charging source 702, and smart controller of battery pack 704. Power pickup coil 724 can receive inductive energy from the power transmission coil 712 of inductive source 702.

In one arrangement, a communications link 713 in accordance with the Bluetooth™ Global Specification for wireless connectivity may be implemented to transmit battery charging data information between the inductive charging source 702 and battery pack 704. It should be appreciated that conventional Bluetooth™ technology was introduced to provide connectivity between portable devices like mobile phones, laptops, personal digital assistants (PDAs), and other nomadic devices up to a range of approximately 100 meters. Bluetooth-enabled devices operate in an unlicensed Instrumentation, Scientific, Medical (ISM) band at 2.4 GHz. This system uses frequency-hopping to enable the construction of low-power, low-cost radio devices with a small footprint. The Bluetooth-enabled devices transmit and receive on 79 different hop frequencies from 2402 to 2480 MHz, switching between one hop frequency to another in a pseudo-random sequence, 1600 times a second. The gross data rate is 1 Mb/s. A time-division duplex scheme is used for full-duplex transmission. In another arrangement, the communication link 713 may be a widely available communication standard, such as the Infrared Data Association ("IrDA") specification and protocols. This wireless communication protocol provide low-cost, short-range, cross-platform, point-to-point communications at various transfer rates for devices employing the standardize protocol. There are various suppliers of compatible hardware for transceivers and interfacing software modules to implement for the battery charger assembly 304 and inductive power source 302.

Figure 8:
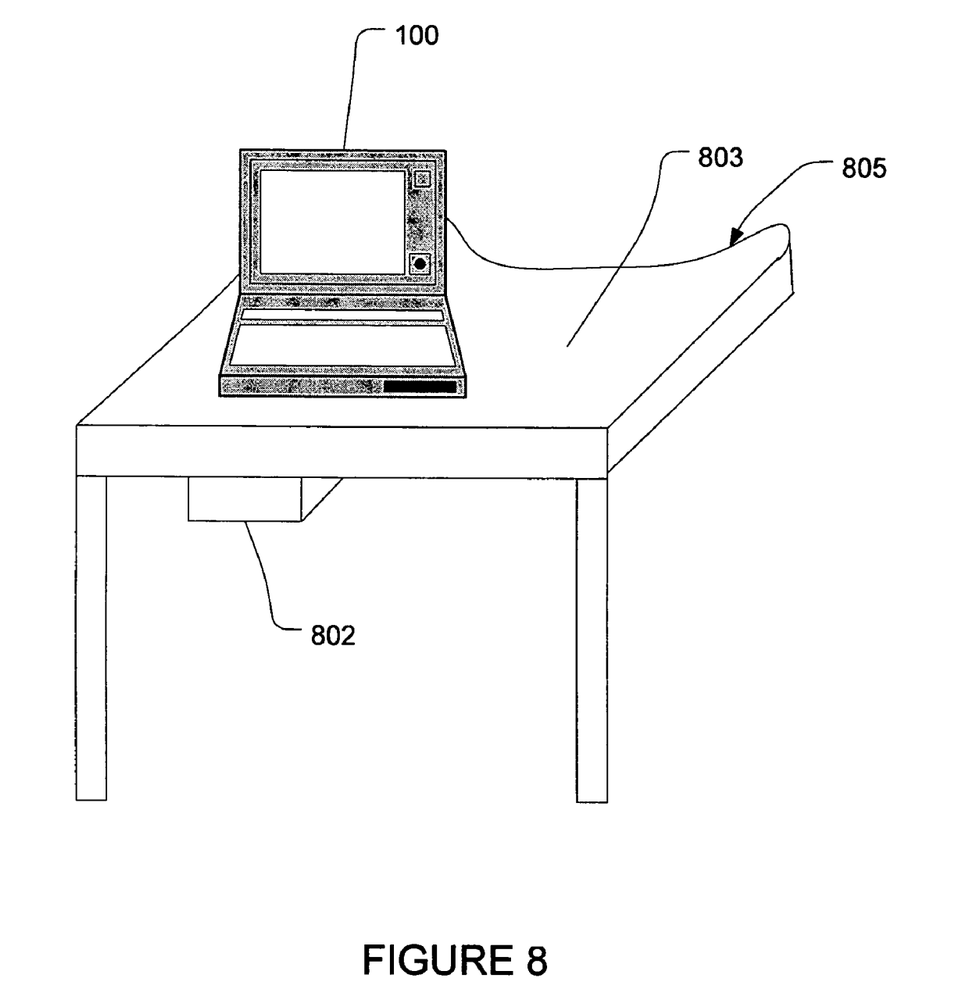
FIG. 8 is a schematic representation a charging system according to one or more aspects of the present invention.

An example charging system 800 is illustrated in FIG. 8. Charging system 800 components may include an inductive charging source 802 that wirelessly provides electrical power to a battery pack (with inductive charging module) attach to the host device 100 embodied as a laptop computer. It should be noted that any or all of the features, subsystems, and functions of inductive charging source 302 and 702 may be included in the inductive charging source 802. As shown in FIG. 8, the host device 100 is placed on a work surface 803 of a table 805. The work surface may have top surface and a bottom surface. In one arrangement, the inductive charging source 302 can be physically mounted underneath the work surface 803 on the bottom surface. Alternatively, the inductive charging source 802 may be disposed inside the work surface 803 so that the source 802 is generally recessed therein, e.g., slightly underneath the top surface. This configuration allows the source 302 to be located at a short distance from the battery pack for maximum efficiency of energy transfer and inductive coupling. Nevertheless, multiple charging sources can be provided on or with the work surface. This allows for multiple mobile devices to be charged in the same location. Nonetheless, the inductive charging source 302 may be placed on the top surface instead of being embedded. Thus, users with laptop computers or tablet computers can place the devices on the work surface and external power can be automatically provided to the battery packs for charging. The users need not worry about the amount of power capacity in the batteries or attempt to find an area to plug in the computer with power cords. This is particularly useful in working environments during long meetings when the mobile computers are used for electronic mail, typing, handwriting, web-browsing, presentations, data searching or other tasks. Further, while a work surface has been described, the inductive charging source can be provided in a wide range of apparatus, including lecterns, desks, vehicles, and the like.

Referring to FIG. 3, in one alternative arrangement, inductive power source 302 may operate in a networked environment using logical connections to one or more remote computers, such as a remote computer 109 shown in FIG. 1. The remote computer 109 may be a server, a router, a network PC, a peer device, or other common network node. The logical connections depicted in FIG. 1 that can be implemented with inductive power source 302 may include a local area network (LAN) 112 and a wide area network (WAN) 113. Such networking environments are commonplace in offices, enterprise-wide computer networks, intranets, and the Internet. In a networked configuration, the inductive power source 302 is enabled to receive data associated with the battery pack 304, and transmit this data for trusted energy communications. For example, the remote computer 109 may be associated with a source entity that may retain data, such as battery pack ID numbers, serial numbers, manufacturer's names and date of manufactures of various battery packs. This information can be used for data integrity and security. Further, the source entity may include digital certificate information or a digital signature and transmit those items to the inductive power source 302 as requested. This data can be used as depicted in FIG. 6 for authentication for trusted energy transfer arrangement.

Inductive charging solutions provide user convenience by providing wireless power to mobile computing device and communications devices. To maximize the flexibility, efficiency and/or safety of these inductive charging solutions, communication between the source and the consuming device can be established to exchange operating parameters, such as charging voltage and maximum expected power consumption. The communication may also provide for authentication of devices that are allowed by the source to be charged and devices which may be placed in close proximity to the charging source. This prevents virus infections and effectively closes a backdoor for computer viruses. Thus, computer users do not need to carry power cables and AC power adapters with them. There is no need to search for an electrical plug location that may be in inconvenient places. The hazards related to power cords are eliminated. There is no need to carry supplemental battery packs to replace the depleted energy of the battery. And the inconvenience of carrying additional battery packs is eliminated. Thus, the mobile computing user receives the freedom for portable computing and protection from computer viruses which may attempt to infect the host device by way of communication pathways in the battery pack during data transmission or energy transfer.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or any combination thereof. In one embodiment, the aspects may be implemented via Application Specific Integrated Circuits (ASICs). Those, however, skilled in the art will recognize that the embodiments disclosed herein, in whole or in part, can be equivalently implemented in standard Integrated Circuits, as a computer program running on a computer, as a program running on a processor, as firmware, or as virtually any combination thereof and that designing the circuitry and/or writing the code for the software or firmware would be well within the skill of one of ordinary skill in the art in light of this disclosure.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. A battery pack configured for receiving inductive energy for charging a battery, comprising:
   a processor unit for processing computer readable data relevant to receiving the inductive energy and for processing data communications with a computer system, wherein the processor unit is programmed to operate in a polling listening mode;
   a pickup coil controlled by the processor unit to receive an inductive data communication by listening for an inductive source to alternate between an energized state and a de-energized stage at regular intervals while in the polling listening mode and configured for receiving the inductive energy;
   a charger operatively coupled to the processor unit and the pick-up coil, the charger configured to output a direct current powered by the inductive energy and relevant to the inductive data communication; and
   a battery configured for receiving the direct current.

2. The battery pack in accordance with claim 1, in which the processor unit is configured to provide authentication data for inductive energy charging.

3. The battery pack in accordance with claim 1, further comprising a communications device operatively coupled to the pickup coil.

4. The battery pack in accordance with claim 3, in which the communications device is configured to receive the computer readable data and transmit the data to the pick up coil.

5. The battery pack in accordance with claim 1, in which the processor unit is configured to provide a plurality of charging parameters to a charging source which provides the inductive energy.

6. The battery pack in accordance with claim 1, in which the processor unit is configured to provide a digital security certificate to a charging source.

7. The battery pack in accordance with claim 1, in which the processor unit is configured to send data to the computer system so as to indicate it is receiving inductive energy.

8. The battery pack in accordance with claim 2, further comprising an antenna and a communications device configured to receive the computer readable data and configured to transmit the data to the antenna for wireless data communications to a charging source.

9. A computer implemented method of charging a battery with a battery pack having a processor unit for processing computer readable data, comprising the steps of:
   using the processor unit to control a pickup coil in the battery pack to receive an inductive polling message while operating in a polling listening mode by listening for an inductive charging source to alternate between an energized and a de-energized state at a regular intervals
   transmitting from the battery pack a request for power to the charging source responsive to the polling message;
   receiving at the battery pack inductive power from the charging source responsive to the transmitted request;

displaying an object on a graphical user interface, in response to the step of receiving, in order to visually indicate that external power is being received, wherein the displayed object visually differentiates between the battery pack receiving external inductive power and external utility power;

generating a direct current in the battery pack responsive to the received inductive power; and using the direct current to charge the battery.

10. The method in accordance with claim 9, in which the step of transmitting includes a step of transmitting charging parameters to the charging source.

11. The method in accordance with claim 9, in which the step of transmitting includes a step of transmitting authenticating data to the charging source.

12. The method in accordance with claim 9, further including a step of initiating a charger responsive to the step of receiving.

13. The method in accordance with claim 9, further including a step of transmitting data to a computer system for indicating the step of receiving inductive power.

14. The method in accordance with claim 9, wherein the step of displaying an object on a graphical user interface includes displaying an icon.

15. The battery pack of claim 1 wherein the inductive data communication includes a polling message including a header and a payload.

16. The battery pack of claim 15 wherein the payload includes at least one of an operating parameter and authentication information and wherein the authentication information includes a security certificate.

17. The battery pack of claim 16, wherein the payload includes at least one of an operating parameter and authentication information and wherein the authentication information includes a digital signature.

18. The method in accordance with claim 9, wherein the battery pack includes a coil, and the polling message and inductive power are received via the coil.

19. The method in accordance with claim 9, further comprising:

receiving an inductive data communication from the charging source.

* * * * *

UNITED STATES PATENT AND TRADEMARK OFFICE
CERTIFICATE OF CORRECTION

| | | |
|---|---|---|
| PATENT NO. | : 7,375,492 B2 | |
| APPLICATION NO. | : 10/733760 | |
| DATED | : May 20, 2008 | |
| INVENTOR(S) | : John Charles Calhoon et al. | |

It is certified that error appears in the above-identified patent and that said Letters Patent is hereby corrected as shown below:

In column 14, lines 62-63, in Claim 9, delete "state at a regular intervals" and insert -- state at regular intervals; --, therefor.

Signed and Sealed this
Nineteenth Day of April, 2011

David J. Kappos
*Director of the United States Patent and Trademark Office*